United States Patent
Moore et al.

(10) Patent No.: US 8,325,390 B2
(45) Date of Patent: Dec. 4, 2012

(54) SYSTEM AND METHOD TO CUE OPERATOR RESPONSE IN A MANUALLY-DRIVEN DOCUMENT SCANNER

(75) Inventors: Michael J. Moore, Beverly Hills, MI (US); John Gudenburr, Canton, MI (US); Sammy C. Hutson, Novi, MI (US); William L. Kozlowski, Novi, MI (US)

(73) Assignee: Burroughs, Inc., Plymouth, MI (US)

( * ) Notice: Subject to any disclaimer, the term of this patent is extended or adjusted under 35 U.S.C. 154(b) by 1160 days.

(21) Appl. No.: 12/145,729

(22) Filed: Jun. 25, 2008

(65) Prior Publication Data

US 2009/0323141 A1  Dec. 31, 2009

(51) Int. Cl.
*H04N 1/024* (2006.01)
*H04N 1/04* (2006.01)

(52) U.S. Cl. ........ 358/473; 358/472; 358/486; 358/442; 382/313

(58) Field of Classification Search .................. 358/473, 358/472, 497; 382/137–140, 312, 313, 320; 235/379
See application file for complete search history.

(56) References Cited

U.S. PATENT DOCUMENTS

| | | | | |
|---|---|---|---|---|
| 4,684,998 A * | 8/1987 | Tanioka et al. | ............... | 358/473 |
| 4,969,054 A * | 11/1990 | Tsuji et al. | .................... | 358/473 |
| 5,414,533 A * | 5/1995 | Sawase et al. | ................ | 358/473 |
| 5,861,622 A * | 1/1999 | Tsai | .............................. | 358/473 |
| 5,999,666 A * | 12/1999 | Gobeli et al. | ................. | 382/313 |
| 6,957,773 B2 * | 10/2005 | Gelbart | ......................... | 235/454 |
| 7,469,824 B1 * | 12/2008 | Crews et al. | .................. | 235/379 |
| 2009/0148028 A1 * | 6/2009 | Gudenburr et al. | ........... | 382/139 |

* cited by examiner

*Primary Examiner* — Cheukfan Lee
(74) *Attorney, Agent, or Firm* — Honigman Miller Schwartz and Cohn LLP

(57) ABSTRACT

A document scanner and associated feedback mechanism are disclosed. The document scanner includes a document bed including a document positioning surface, and a scanning module slidably connected to the document bed, the scanning module manually movable across the document positioning surface. The document scanner further includes a feedback mechanism arranged to receive information about a speed of movement of the scanning module, and output a feedback signal to a user of the document scanner.

20 Claims, 6 Drawing Sheets

SYSTEM AND METHOD TO CUE OPERATOR RESPONSE IN A MANUALLY-DRIVEN DOCUMENT SCANNER

TECHNICAL FIELD

The present disclosure relates to methods and systems for operation of a document scanner. More specifically, the present disclosure relates to methods and systems to cue operator response in a manually driven document scanner, such as a check scanner.

BACKGROUND

Electronic document reading and imaging systems are commonly employed in situations where efficient, cost-effective methods to record and process respective document information are required. For example, such systems are utilized in applications where it is advantageous to electronically scan and read check routing and account information using on-site document scanning technologies. One benefit of this approach relates to an inherent expedited check processing ability as the check information is immediately available. Additionally, as a result of the Check Clearing for the $21^{st}$ Century Act (commonly referred to as Check 21 legislation) the need to physically transport the check to a specialized check processing facility is eliminated, thereby avoiding the substantial delays and losses necessarily incurred by check transportation and handling.

Typically, such on-site check scanning technologies employ a manually movable, linear scanning mechanism that moves along the length of the check to acquire image and routing information. In such a manually driven system the data acquisition procedure is particularly sensitive to the rate that the linear scanning mechanism is moved over the check. Consequently, the integrity of the acquired data is a strong function of operator skill and experience. Trial and error techniques are used to capture image and character data that is useable from a manual linear scanning mechanism, in that a user must scan an entire check or other document, and then review the scanned information for accuracy, because the user is unsure whether the correct scanner movement rate was achieved. This reduces efficiency of the scanning process.

For these and other reasons, improvements are desirable.

SUMMARY

In accordance with the following disclosure, the above and other problems are solved by the following:

In a first aspect, a document scanner is disclosed. The document scanner includes a document bed including a document positioning surface, and a scanning module slidably connected to the document bed, the scanning module manually movable across the document positioning surface. The document scanner further includes a feedback mechanism arranged to receive information about a speed of movement of the scanning module, and output a feedback signal to a user of the document scanner.

In a second aspect, a feedback system for a manually operable document scanner is disclosed. The feedback system includes a cue module configured to receive a movement rate of a manually-operable scanning module of a document scanner, the cue module further configured to translate the movement rate to a cue response. The feedback system also includes a cue output perceptible to a users the cue output altered based on the cue response.

In a third aspect, a method of scanning a document using a manually-operable document scanner is disclosed. The method includes placing a document on a document positioning surface of a document bed, and manually sliding a scanning module across the document positioning surface to capture image and character data relating to the document. The method further includes, while manually sliding the scanning module, observing feedback from a feedback mechanism, the feedback including information about the rate of movement of the scanning module.

In a fourth aspect, a method of providing user-feedback from a manually-operable document scanner is disclosed. The method includes receiving a document on a document positioning surface of a document scanner. The method further includes receiving information regarding a rate of movement of a scanning module across a document positioning surface during a scanning operation. The method also includes determining, in a cue module, a cue response based on the rate information, and based on the cue response, providing an interpretable cue indicating whether the rate of movement of the scanning module is with an allowable range.

DETAILED DESCRIPTION

Figure 1:
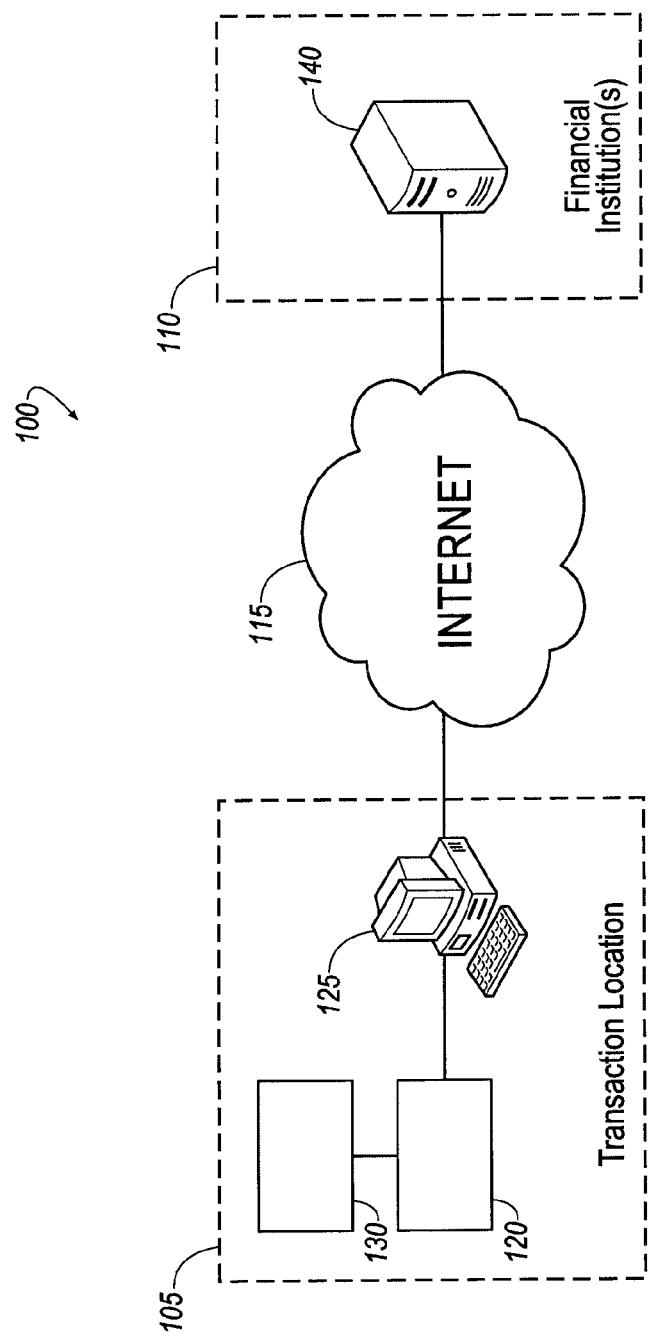
FIG. 1 is a schematic depiction of a network in which a document scanner having features in accordance with the present disclosure may be utilized.

Various embodiments of the present disclosure will be described in detail with reference to the drawings, wherein like reference numerals represent like parts and assemblies throughout. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure relates to a manual use, low-cost document reader, such as a document scanner, incorporating a feedback mechanism that transmits interpretable cues to an operator. In general, the operator may utilize the cues to properly operate the document scanner during a scanning procedure. Document scanners in accordance with the principles of the present disclosure demonstrate a simple and cost-effective methodology for capturing relevant document information.

Now referring to FIG. 1, an example system is shown incorporating a document scanner having features consistent with principles of the present disclosure. By document scanner, it is intended that any of a number of types of document scanning devices are incorporated which can capture image or text data of a printed document for electronic storage and transmission. FIG. 1 is a network 100 in which document information may be scanned by a document scanner 120 during a scanning procedure. The scanned document information may then be processed locally and/or transferred to a remote location. One example document scanner 120 can have a feedback mechanism 130 such that cue may be communicated to a user, as described further below. The example network 100 includes one or more transaction locations 105 and financial institutions 110, connected by a communication network, shown as an internet connection 115. A transaction location 105 can be any of a number of locales where a financial transaction may take place, such as for purchase or sale of goods and services. However, in general, a transaction location 105 can include virtually any location where on-site document scanning and subsequent data processing may be desired. Other example transaction locations 105 include schools, churches, and homes.

In one embodiment, each transaction location 105 includes a document scanner 120 interconnected with a computing system 125. In general, the document scanner 120 is arranged and configured to electronically acquire information about a document. In certain embodiments, the document scanner 120 can be a personal check scanner that is optimally sized and designed to be a low-cost solution to scan images of one or both sides of the check and/or read account and routing information.

The computing system 125 can be any of a number of types of computing systems, such as a general purpose personal computer, or a specialized computer such as a cash register or inventory system. The computing system 125 can interconnect with the document scanner 120 by any of a number of standard or specialized communication interfaces, such as a USB, 802.11 a/b/g network, RF, infrared, serial, or other data connection. In certain embodiments, the computing system 125 runs an application configured to control the document scanner 120; in further embodiments, the computing system receives data from the document scanner 120 and stores and/or communicates the data (images, text, or other information) to other systems to which it is interconnected.

In one example embodiment, the document scanner 120 can be additionally interconnected with a feedback mechanism 130. In general, the feedback mechanism 130 provides a user real-time information such that a scanning mechanism, integrally formed with the document scanner 120, is properly handled during the scanning procedure. In this manner, the integrity of the document information acquired by the scanning mechanism is preserved, thereby reducing the need to re-scan the document. In certain embodiments the feedback mechanism 130 can be configured to be integrated with the document scanner 120, or as depicted, can be arranged as a separated entity.

In the embodiment shown, each of the financial institutions 110 includes a computing system 140. In certain embodiments the computing system 140 is configured to receive electronic records of financial transactions relevant to the financial institutions. The computing system 140 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions can be tracked using the network 100 as well.

The internet connection 115 depicted can be any of a number of WAN, LAN, or other packet based communication networks such that data can be shared among a number of computing systems or other networked devices. Furthermore, although in the embodiment shown the two computing devices 125, 140 are at different, specific locations, the computing devices 125, 140 and/or the document scanner 120 and the scanning feedback mechanism 130 may be located at the same location or within the same network.

Referring now to FIGS. 2-6, a document scanner incorporating a feedback mechanism in accordance with the principles of the present disclosure is shown.

Figure 2:
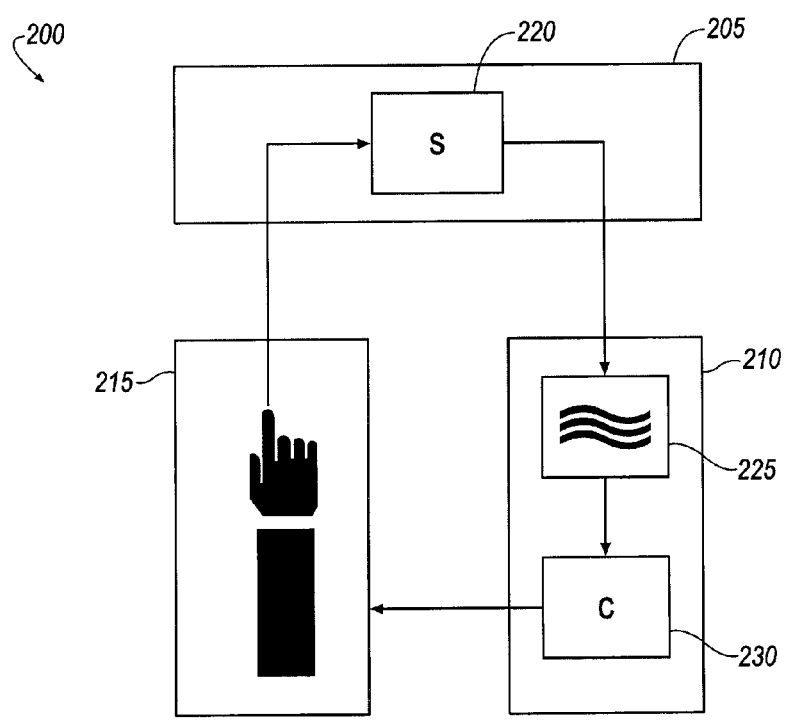
FIG. 2 is a schematic view of a document scanning device according to a possible embodiment of the present disclosure.

FIG. 2 is an example system 200 relating to a document scanner 205 incorporating a feedback mechanism 210. The system 200 can be operated in the example network 100 of FIG. 1. In general, in operation a user 215 manually displaces a scanning module 220, integrally formed with the document scanner 205, across a document to scan document information during a scanning procedure. In one embodiment, rate information S, representing the speed that the user 215 moves the scanning module 220 during the scanning procedure, is monitored and communicated to the feedback mechanism 210. In certain embodiments, the feedback mechanism 210 interprets the rate information with a mapping module 225; an intermediate parameter representing a desired cue is then transferred to a cue module 230. The cue module 230 manipulates the desired cue into an interpretable cue, C, and communicates the interpretable cue to the user 215 to complete a feedback loop. In this manner, the user 215 is provided pseudo-instantaneous feedback information regarding the speed that the scanning module 220 is manually displaced over the document during the scanning procedure. Accordingly, as described in further detail below, the rate that the scanning module 220 is displaced over the document may be adjusted by the user 215 to fall within an allowable predefined range. In general, the rate at which the scanning module 220 moves during the scanning procedure is required to be within acceptable limits to allow respective scanning elements located on the scanning module 215, to properly acquire respective document data.

Figure 3:
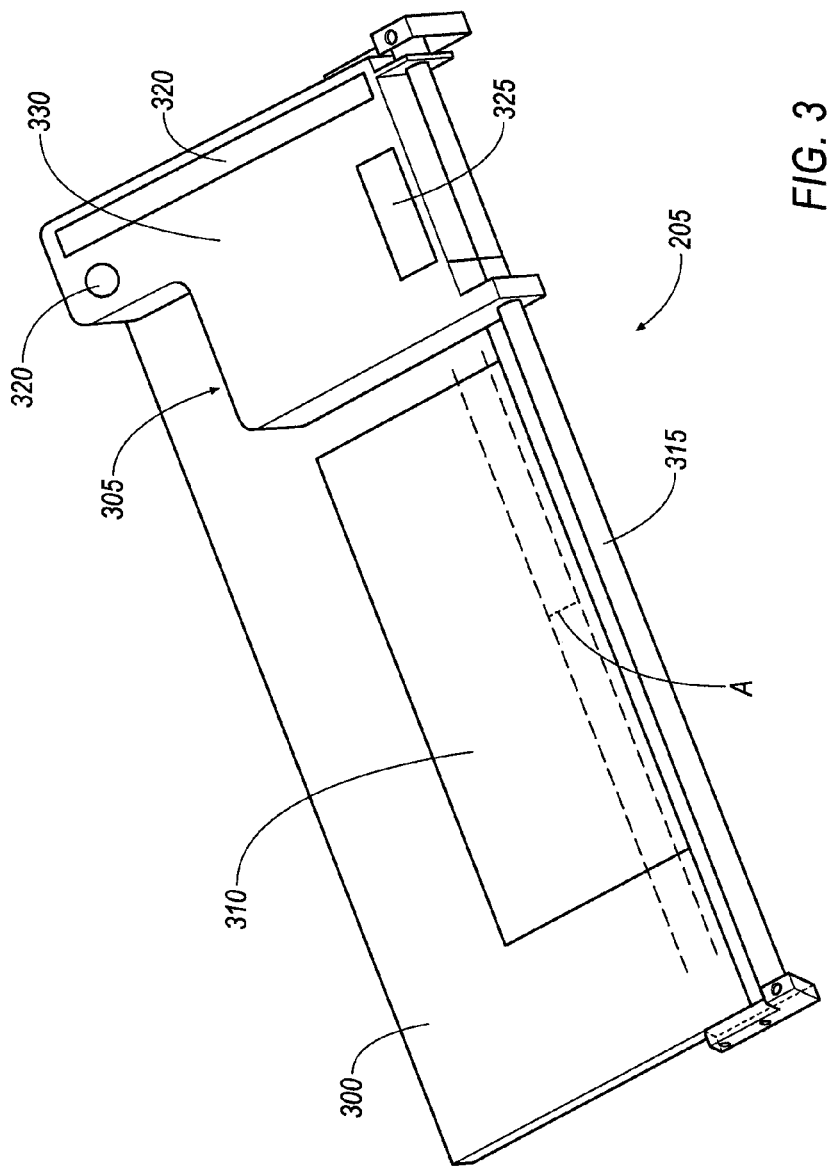
FIG. 3 is a perspective view of an example document scanner.

FIG. 3 is a perspective view of the document scanner 205 as depicted in FIG. 2, according to a possible embodiment of the present disclosure. In general, the document scanner 205 is generally configured to be a manual use, low-cost electronic information capture device capable of scanning and/or reading images and characters printed on a document. In one embodiment the document scanner 205 may be used to acquire information associated with a personal check. However, it will be appreciated that the document scanner 205 may be used to acquire data from any type of document having information that may be electronically read or scanned.

The document scanner 205 generally includes a document bed 300 and a scanning module 305. The document bed 300 includes a document positioning surface 310 configured to receive a document for scanning during the scanning procedure. In one embodiment the document positioning surface 310 is sized to receive a personal check, in such embodiments the document positioning surface 310 can be at least approximately 6 inches in length by approximately 2¾ inches in height. However, it will be appreciated that the document bed 300 and/or the document positioning surface 310 can be modifiable such that any number of different types of documents having different dimensions can be scanned.

The document bed 300 and/or the document positioning surface 310 can be made from or otherwise include a high-friction material, such as a rubber or high-friction plastic material, which assists in maintaining the position of a check or other document during the scanning procedure. Additionally, in certain embodiments, the document bed 300 can correspond to a top surface of an electronic device that interfaces with a computing system 125, as described in FIG. 1. In such embodiments, the document scanner 205 can also include various other electronics, memory, or other systems for image and data processing and storage and additionally can provide a surface to mount a feedback mechanism 210, as described in further detail below.

In general, the scanning module 305 is approximately the same width as the document bed 300 and/or document positioning surface 310 and is slidably attached to the document bed 300 along a slider bar 315. The slider bar 315 is mounted along a side of the document bed 300, such that the scanning module 305 can be manually passed along the entire length of the document positioning surface 310 and/or the length of the document bed 300. In the embodiment shown, the slider bar 315 resides along a single side of the document bed 300; however, in alternative embodiments, additional slider bars or retention mechanisms may be used to retain and/or guide the scanning module 305 along the length of the document bed 300. In certain embodiments, during the scanning procedure the scanning module 305 is moved from a default starting position along the length of the document bed 300, as guided by the slider bar 315. When the scanning module 305 reaches the opposite side of the document bed 300, the scanning procedure is complete, and the scanning module 305 can be returned to the default starting position. However, the scanning module 305 can be configured to scan the document in a unidirectional and/or bidirectional manner depending on a given application.

In one aspect, the scanning module 305 can include one or more scanning elements designed to capture information about the document during the scanning procedure. For example, the scanning module 305 may include a contact image sensor (CIS) 320, a magnetic ink character reader (MICR) 325, and a radial encoder 330. In general, the CIS 320 is an imaging device that includes a linear scan element that can be used to scan an image of a document placed on the document positioning surface 310. The data gathered by the CIS 320 can be combined with technology specific image resolution information and rate information of the scanning module 305 as it moves across the document to transform data collected by the CIS 320 into an image. In this manner, the rendered image can be communicated from the document scanner 205 to other computing systems (e.g. computing system 130 of FIG. 1) by way of a communications interface (e.g. network 115 as illustrated in FIG. 1) or stored in a memory element managed by circuitry incorporated into the document scanner 205. In general, in order to accurately obtain image information, the CIS 320 is required to move across the document at a rate within an acceptable range such that the linear scan element can accurately acquire the scan data.

The MICR 325 is a device used to interpret magnetic features representing alphanumeric characters printed on or embedded in a document. In one embodiment, as the scanning module 305 moves along the length of the document during the scanner procedure, the MICR 325 is positioned to be in contact with the check at a position where magnetic characters are expected. In the figure shown, the MICR 325 traverses a path having a width of dimension 'A' to read magnetic characters representing account and routing information. In a similar manner with respect to the CIS 320, the MICR 320 is required to move across the document at a rate within an acceptable range in order to accurately obtain magnetic character information. As a result, an overall scanning module 305 rate window is realized as scanning element specific restrictions (associated with the CIS 320 and the MICR 325 respectively) effectively superimpose to define an allowable scanning module rate range defined by an upper limit and a lower limit, as described in further detail below.

Additionally, a radial encoder 330 can be incorporated into the scanning module 305. The radial encoder 330, in the embodiment shown, acts as a speed detection assembly, in that it is used to calculate a rate at which the scanning module 305 moves along the document bed 300 during the scanning procedure. In general, the radial encoder 330 includes a rotating element having a plurality of discrete indicators, such as differential colors or physical characteristics. A rate of rotation of the rotating element may be detected by supporting circuitry to quantify the speed (or, rate) of the scanning module 305. In this manner, the speed of the scanning module 305 as determined by the radial encoder 330 is used by the document scanner 205 to formulate a scanned image using the CIS 320 and to read and interpret magnetic characters using the MICR 325. Other speed detection assemblies can be used as well.

In certain embodiments, a speed compensation algorithm is used to correct for speed variation during the scanning procedure to achieve optimal MICR and CIS module performance. In such embodiments, the document scanner 205 can include various electronics, memory, or other systems to implement the speed compensation algorithm. However, even using such an algorithm (e.g. executed in hardware or software incorporated in the document scanner) there exists a lower limit and an upper limit on the acceptable speed of the scanning module 305 with respect to the document positioning surface 310. If the scanning module 305 is moved too slowly, the MICR 325 cannot accurately capture character information. If the scanning module 305 is moved too quickly, the CIS 320 cannot capture an accurate image of the document. The exact speed values that define the acceptable range are defined by the physical characteristics of the MICR 325 and CIS 320, including the desired resolution of the image captured by the CIS 320, and the response speed of both components 320, 325. A transducer 335 is incorporated in the document scanner 205 to provide feedback to the user to indicate whether the speed at which the user is manually moving the scanning module 305 is within acceptable bounds. The transducer can take many forms, such as a light emitting diode (LED) or other display, a sound output, or other user-perceptible output. In certain embodiments the transducer 335 receives output from a cue module implemented in circuitry of the document scanner or a personal computer connected thereto. Example cue modules are described in FIGS. 2 and 4, respectively.

Figure 4:
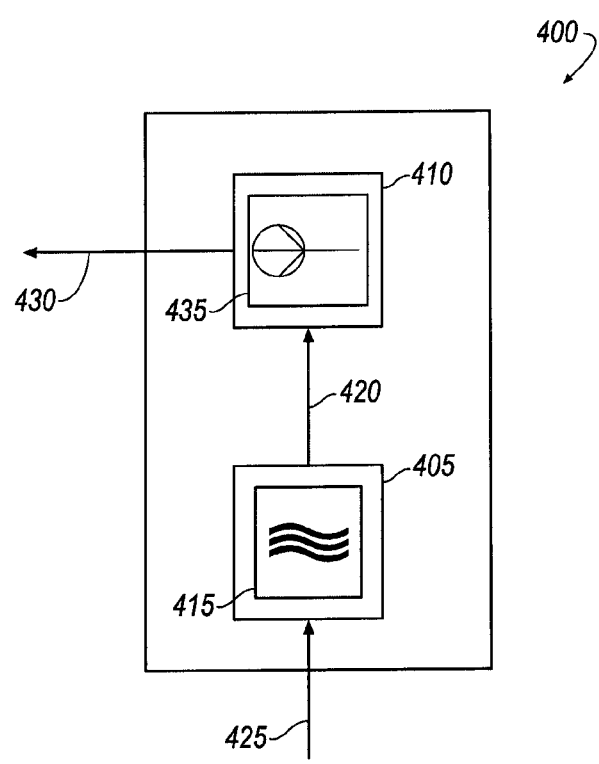
FIG. 4 is a schematic diagram of a feedback mechanism for operating the document scanner of FIG. 3.

FIG. 4 shows a feedback mechanism 400 as described earlier with reference to FIG. 2. In one embodiment the feedback mechanism 400 is configured and optimized for use in a low-cost device. In general, the feedback mechanism 400 can be operated together with the document scanner 205 and incorporated into the network 100 as detailed in FIG. 1. However, it will be appreciated that the feedback mechanism 400 can be integrated with or used in tandem with any type of device and/or application where user feedback is required.

In one embodiment, the feedback mechanism 400 includes a mapping module 405 and a cue module 410. In general, the mapping module 405 is configured to map (or equivalently, project) a variable representing the speed of the scanning module 305 during the scanning procedure (FIG. 3) to a known transfer characteristic 415. In one aspect, the mapping is a linear transformation of an input variable into an output variable representing a desired cue response 420, as described further below. It will be appreciated that there are many ways to define the transfer characteristic 415. In this manner, any output variable, as specified by application specific criteria, can be generated.

In one embodiment, the cue module 410 is configured to manipulate the desired cue response 420 into an interpretable cue 430 that may be communicated to the user 215 to perceive. More specifically, the cue module 410 may utilize a transducer module 435 to transform the desired cue response 420. In one aspect, the transducer module 435 may transform the desired cue response 420 into an interpretable cue 430 having energy at an acoustic wavelength, $\lambda$. In a second aspect the transducer module 435 may transform the desired cue response 420 into an interpretable cue 430 having energy at an optical wavelength, $\lambda$. It will be appreciated that the transducer module 435 may be configured accordingly such that any perceivable interpretable cue 430 may be communicated to user 215.

In certain embodiments, the cue 430 corresponds to an alert communicated to a user of the document scanner as described herein. In these embodiments, the alert can take the form of a visual or audible signal, such as can be transmitted by a display or speaker system as previously described.

Figure 5:
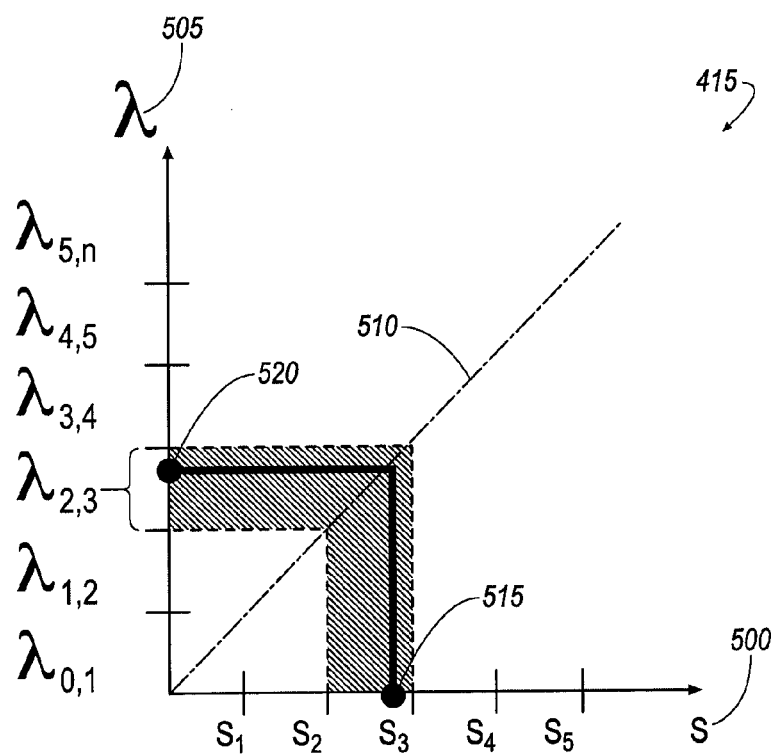
FIG. 5 is a an example transfer characteristic of the feedback mechanism as shown in FIG. 4.

Referring now to FIG. 5, an example transfer characteristic 415 as depicted in FIG. 4 is shown according to a possible embodiment of the present disclosure. In the example embodiment the transfer characteristic 415 generally allows mapping of an input variable, for example, the speed of the scanning module 305 during the scanning procedure, into an output variable representing a desired cue response 420 (e.g. the output of a feedback mechanism, such as a light emitting diode). In one aspect, the mapping is a mathematical algorithm, such as a linear transformation, that may be visualized using a planar Cartesian coordinate system. In one embodiment, the first quadrant of an S-axis 500 represents a continuum of allowable scanner module rates and a %-axis 505 represents discrete values that may be assigned to the desired cue response 420. In general, the transfer characteristic 415 utilizes a mathematical function 510 that can use an abscissa (representing a scanning module rate input 425) as the independent variable to calculate an ordinate (representing a desired cue response 420) value output. It will be appreciated that the mathematical function 510 may take on any number of characteristics and may be adjusted accordingly for a given application. For example, the mathematical function 510 may be a linear function with a slope of one as depicted, or in alternative embodiments the mathematical function 510 may represent a polynomial function, or an exponential function, etc. to dictate the mapping of an input speed to an output response.

As mentioned, the example transfer characteristic 415 can be modifiable to be application specific. In the context of a document scanner 205 incorporating a feedback mechanism 210 in accordance with the present disclosure, S1 can represent a lower limit, as determined by the minimum scanning module rate necessary for the MICR 325 to accurately acquire alphanumeric information on a personal check. The upper limit represented by value S4 can be determined by the maximum data acquisition speed of the CIS 320. In the example, during the scanning procedure, the rate at which the scanning module 305 is moved by the user 215 can be periodically mapped to the S-axis 500. In this manner, the cue module 410 can transform the calculated desired cue response 420 into an interpretable cue 430 that may be communicated to the operator 205 to perceive.

In one example embodiment the desired cue response 420 can represent a frequency having energy at an optical wavelength, $\lambda$. In such an example, a visual representation may be implemented by the cue module 410 with one or more light emitting diodes (LED). In one aspect, a single LED capable of transmitting visible light at various wavelengths can be provided. In a second aspect, a plurality of LEDs, each LED capable of producing visible light at a single wavelength, can be provided. As an example, if in at one specific measurement the scanner module input 425 falls arbitrarily on the S-axis 500 between S3-S2, that rate may be represented as abscissa 515. Subsequently, the mathematical function 510 may use the abscissa 515 as the independent variable to calculate ordinate 520. In this example, the discrete frequency $\lambda2,3$ results from the calculation that can be subsequently encoded as the desired cue response 420.

In this manner, the operator 205 may be provided real time feedback information that may be used to maintain the scanning module rate within an acceptable range of limits. In the example embodiment, other possible discrete frequencies can be calculated. For example, still referring to FIG. 5, if the scanner module input 425 falls below S1, the ordinate 520 would fall within the discrete frequency $\lambda0,1$. In the example $\lambda0,1$ may be encoded to turn the one or more LEDs off, indicating to the user 215 that the scanning module 305 is not being displaced fast enough to acquire valid document information. In another example, if the scanner module input 425 has reached the lower limit S1, one or more LEDs may shine "yellow" as encoded by the $\lambda1,2$ frequency. In yet another example, if the scanner module input 425 exceeds the lower limit S2 by a predetermined amount such that the scanning module speed is in an optimum range, one or more LEDs may shine "green" as encoded by $\lambda2,3$ frequency, indicating that the scanning module speed is an optimal range. In yet another example, if the scanner module input 425 approaches the upper limit S3 within a predetermined amount one or more LEDs can shine "orange" as encoded by the $\lambda3,4$ frequency. In yet another example, if the scanner module input 425 passes the upper limit S4 within a predetermined amount one or more LEDs can shine "red" as encoded by the $\lambda4,n$ frequency, indicating to the user 215 that the scanning module 305 is moving too fast to acquire relevant document data. The following table summarizes an example response of the LEDs in accordance with this example embodiment:

| MICR/CIS Speed | LED Color | Notes |
| --- | --- | --- |
| Below Lower Limit | OFF | |
| Between Lower Limit and Lower Limit + X | Yellow | |
| Between Lower Limit + X and Upper Limit − X | Green | |
| Between Upper Limit − X and Upper Limit | Orange | Red and Yellow LED Active |
| Above Upper Limit | Red | |

There are many alternative embodiments such that the operator 205 may be provided with real time feedback information that may be used to maintain the scanning module rate within an acceptable range of limits, or thresholds. For example, the desired cue response 420 can represent a frequency having energy at or within an acceptable deviation from an acoustic wavelength, $\lambda$. In a similar fashion to the previous example, as the scanner module input 425 is mapped along the λ axis range from λ0,1 through λ4,n an audible frequency generated by the transducer module 410 may range from a low tone indicating to the user 215 that the scanning module 305 is not being displaced fast enough to acquire valid document information, to a high pitched tone to indicate to the user 215 that the scanning module 305 is moving too fast to acquire relevant document data. Other audible and/or visual feedback mechanisms can be used as well, such as a gauge or display indicating the desired and current speed of the scanning module 305, or other mechanisms.

Figure 6:
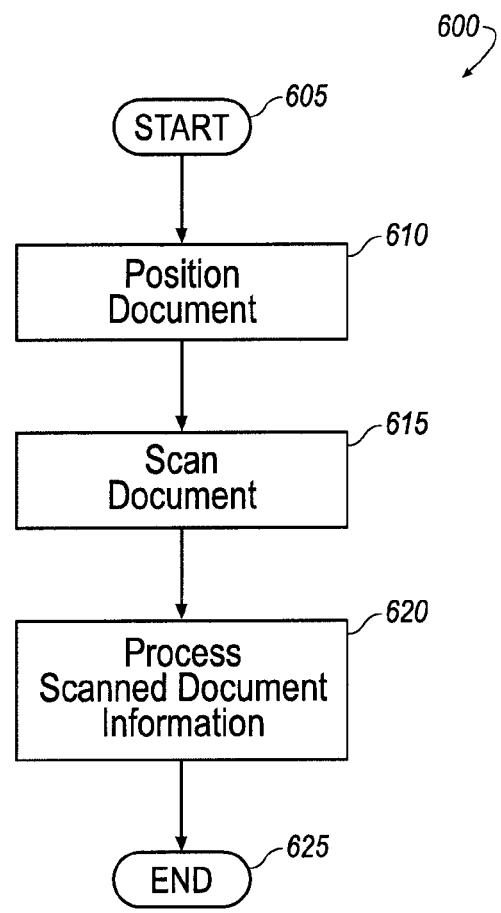
FIG. 6 is a flow diagram for methods and systems to operate a document scanner in accordance with a possible embodiment of the present disclosure.

Referring now to FIG. 6, an example flowchart of methods and systems 600 for operation of the document scanner are discussed according to the possible embodiment of the present disclosure. The system discussed is generally configured to be a low-cost device capable of providing an operator interpretable cues based on the manual displacement of a scanning module during a scanning procedure, as discussed with reference to FIGS. 1-5. In other embodiments, different types of document scanners having different arrangements of feedback mechanisms, scanning elements, and other features could be used as well.

The methods and systems 600 are instantiated at a start operation 605. Operational flow proceeds to a document placement module 510. The document placement module 510 corresponds to an end user, such as an individual at a home office, positioning a document (e.g. a check) onto the document positioning surface of the document bed.

The example method 600 is instantiated at a start operation 605. Operational flow proceeds to a document placement module 610. The document placement module 610 corresponds to an operator, such as a user at a home business, positioning a document (e.g. a check) onto a document positioning surface of a document bed, such as the document positioning surface 310 of document bed 300 described in conjunction with FIG. 3, above. By positioning the document on the document positioning surface, the user intends that the document remain in place during a scanning procedure performed using the document scanner.

Operational flow proceeds to a scan module 615, which, in the various embodiments disclosed herein, corresponds to capture of information printed on a document using the document scanner. The scan module 615 generally corresponds to the operator manually actuating a scanning module over a document placed in a scanning location of a document scanner, to allow the various information capture devices (e.g. a contact image sensor, magnetic ink character reader, radial encoder, or other elements) to capture information printed on the document. In the case of a check, for example, image and character information is captured and used to process the check (e.g. check routing information, payor and payee information, check amount, date, signature image, etc.).

During operation of the scan module 615, the scanning module (e.g. scanning module 305 of FIG. 3) proceeds along the length of the document from a default starting position. The rate at which the scanning module is displaced along the length of the document monitored and communicated to a feedback mechanism (e.g. feedback mechanism of FIG. 4) that provides an interpretable cue to the operator that indicates if the rate of the scanning module is with an allowable range, as determined by the technical requirements of the MICR and CIS to sufficiently acquire respective information. If necessary, based on the feedback form the feedback mechanism, a user can adjust the speed of the scanning module to an acceptable rate of travel. A speed compensation algorithm is used to correct for speed variation during the scanning procedure to achieve optimal MICR and CIS module performance.

Operational flow proceeds to a processing module 620, which corresponds to use and/or storage of information captured by the document scanner. The processing module 620 can, in various embodiments, incorporate a variety of storage and usage operations. For example, the captured image and/or character data can be stored in a memory element of the document scanner (such as in a memory integrated onto a printed circuit board) or a computing system interconnected to the document scanner, or communicated across a network as illustrated in FIG. 1, wherein the data is sent to a remote location (e.g. a financial institution) for processing, reducing the time required for notifying a financial institution of the document information by bypassing the requirement of physical transport of the document. Operational flow terminates at an end operation 625, which corresponds with completed information capture from a document.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A document scanner comprising:
a document bed including a document positioning surface;
a scanning module slidably connected to the document bed, the scanning module manually movable across the document positioning surface; and
a feedback mechanism arranged to receive information about a speed of movement of the scanning module, and output a feedback signal to a user of the document scanner;
wherein the feedback mechanism executes a compensation algorithm on the received information to correct for speed variation of the scanning module, the feedback mechanism outputting a feedback signal to the user when the scanning module is moving at a scanning speed outside of an acceptable speed range.

2. The document scanner of claim 1, wherein the feedback mechanism includes a transducer configured generate a first alert when the scanning module is being moved faster than a threshold speed.

3. The document scanner of claim 1, wherein the feedback mechanism includes a transducer configured to generate a second alert when the scanning module is being moved slower than a second threshold speed.

4. The document scanner of claim 3, wherein the transducer includes one or more light emitting diodes.

5. The document scanner of claim 1, wherein the scanning module includes a contact image sensor.

6. The document scanner of claim 5, wherein the scanning module further includes a magnetic character reader.

7. The document scanner of claim 1, further comprising a speed detection assembly configured to detect a speed of the scanning module with respect to the document positioning surface.

8. The document scanner of claim 7, wherein the speed detection assembly includes a radial encoder.

9. The document scanner of claim 1, wherein the feedback mechanism includes a cue module.

10. A feedback system for a manually operable document scanner, the feedback system comprising:
a cue module configured to receive a movement rate of a manually-operable scanning module of a document scanner, the cue module further configured to translate the movement rate to a cue response; and a cue output perceptible to a user, the cue output altered based on the cue response;

wherein the cue module executes a compensation algorithm on the received movement rate to correct for speed variation of the scanning module, the cue module outputting a feedback signal to the user when the scanning module is moving at a scanning speed outside of an acceptable speed range.

11. The feedback system of claim 10, wherein the cue output is generated by a transducer incorporated into the scanning module.

12. The feedback system of claim 11, wherein the transducer includes one or more light emitting diodes.

13. The feedback system of claim 10, wherein the cue module is implemented in circuitry of a document scanner.

14. The feedback system of claim 10, wherein the cue module receives speed information from a radial encoder incorporated in the scanning module.

15. A method of scanning a document using a manually-operable document scanner, the method comprising:

placing a document on a document positioning surface of a document bed;

manually sliding a scanning module across the document positioning surface to capture image and character data relating to the document; and while manually sliding the scanning module, observing feedback from a feedback mechanism, the feedback including information about the rate of movement of the scanning module;

wherein the feedback mechanism executes a compensation algorithm on the rate of movement of the scanning module to correct for speed variation of the scanning module, the feedback mechanism outputting a feedback signal to the user when the scanning module is moving at a scanning speed outside of an acceptable speed range.

16. The method of claim 15, further comprising, upon determining that the rate of movement is outside of a predetermined threshold, manually adjusting the rate at which the manual sliding occurs.

17. The method of claim 15, wherein observing feedback includes viewing a light emitting diode incorporated on the scanning module.

18. A method of providing user-feedback from a manually-operable document scanner, the method comprising:

receiving a document on a document positioning surface of a document scanner;

receiving information regarding a rate of movement of a scanning module across a document positioning surface during a scanning operation;

executing a compensation algorithm on the received information to correct for speed variation of the scanning module;

determining, in a cue module, a cue response based on the rate information; and based on the cue response, providing an interpretable cue indicating whether the rate of movement of the scanning module is within an allowable range.

19. The method of claim 18, wherein providing an interpretable cue includes activating one or more light emitting diodes incorporated in the scanning module.

20. The method of claim 18, wherein receiving information regarding a rate of movement includes detecting a rate of movement of the scanning module using a radial encoder.

* * * * *